United States Patent [19]
Oosterhuis et al.

[11] Patent Number: 5,983,737
[45] Date of Patent: Nov. 16, 1999

[54] KIT FOR A POWER TAKEOFF ASSEMBLY FOR CONVERTING SAME TO INCLUDE SELECTIVELY CONTROLLED MULTIPLE POWER TAKEOFF SHAFTS

[75] Inventors: Martin J. Oosterhuis, Blacksberg, Va.; Michael A. Betz, Huxley, Iowa; Larry R. Walker, Ames, Iowa; Thomas A. Rosskopf, Panora, Iowa

[73] Assignee: Sauer Inc., Ames, Iowa

[21] Appl. No.: 09/213,947

[22] Filed: Dec. 17, 1998

Related U.S. Application Data

[62] Division of application No. 08/837,209, Apr. 14, 1997, Pat. No. 5,901,605.

[51] Int. Cl.$^6$ ................................................ F16H 37/00
[52] U.S. Cl. ........................................... 74/15.2; 74/15.4
[58] Field of Search ........................... 74/10, 15.2, 15.4, 74/15.63, 606 R

[56] References Cited

U.S. PATENT DOCUMENTS

| | | | |
|---|---|---|---|
| Re. 34,833 | 1/1995 | Hasegawa et al. | 475/83 |
| 2,626,390 | 4/1953 | Wagner | 74/15.2 |
| 2,731,838 | 1/1956 | Wagner | 74/15.2 |
| 4,215,586 | 8/1980 | Morris, Sr. | 74/15.2 |
| 4,304,141 | 12/1981 | Tone et al. | 74/15.2 |
| 4,579,183 | 4/1986 | Irikura et al. | 180/53.1 |
| 4,658,662 | 4/1987 | Rundle | 74/331 |
| 4,727,759 | 3/1988 | Yamaoka et al. | 74/15.2 |
| 4,846,009 | 7/1989 | Paluska, Jr. | 74/331 |
| 4,880,070 | 11/1989 | Irikura | 180/53.1 |
| 5,544,547 | 8/1996 | Ishimaru | 74/180 |

*Primary Examiner*—Tamara L. Graysay
*Assistant Examiner*—David Fenstermacher
*Attorney, Agent, or Firm*—Zarley, McKee, Thomte, Voorhees & Sease

[57] ABSTRACT

A kit for converting a base transmission having a mid PTO shaft and a detachable original equipment rear cover into an optional configuration transmission having a rotatable mid PTO shaft and a rotatable rear PTO shaft that are both selectively drivable such that they can be commanded by the operator to rotate simultaneously or individually. The kit includes a conversion rear cover for replacing the original equipment rear cover, a rear PTO cover with an aperture therein mounted to the conversion rear cover, a rear PTO shaft rotatably supported in the aperture and extending into the conversion rear cover, and a three position selector assembly mounted on the conversion rear cover and the PTO rear cover. When installed on the base transmission, the selector assembly of the kit allows the operator to cause the rotation of the mid PTO shaft only, both the mid and rear PTO shafts simultaneously, or the rear PTO shaft only.

5 Claims, 7 Drawing Sheets

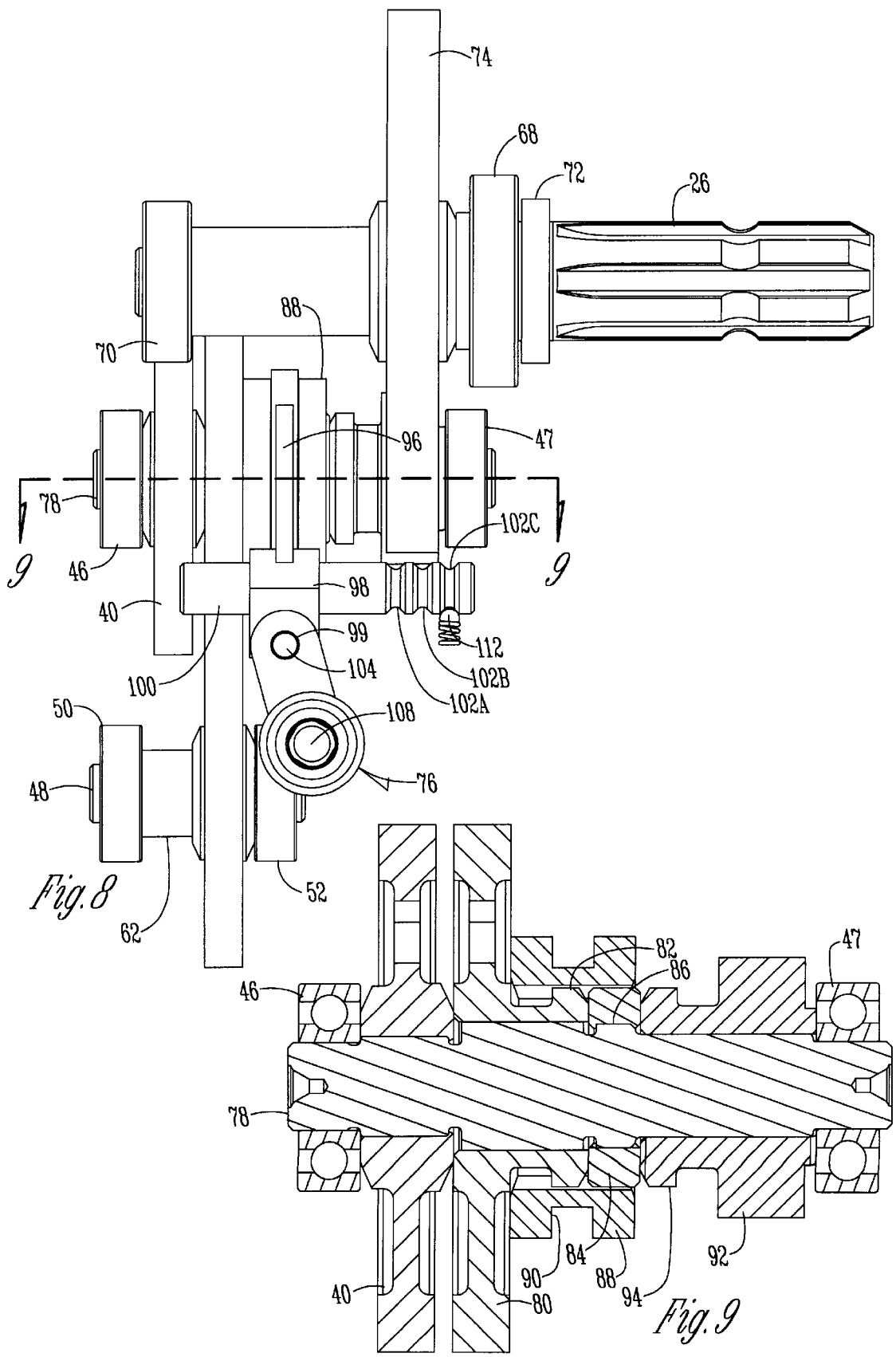

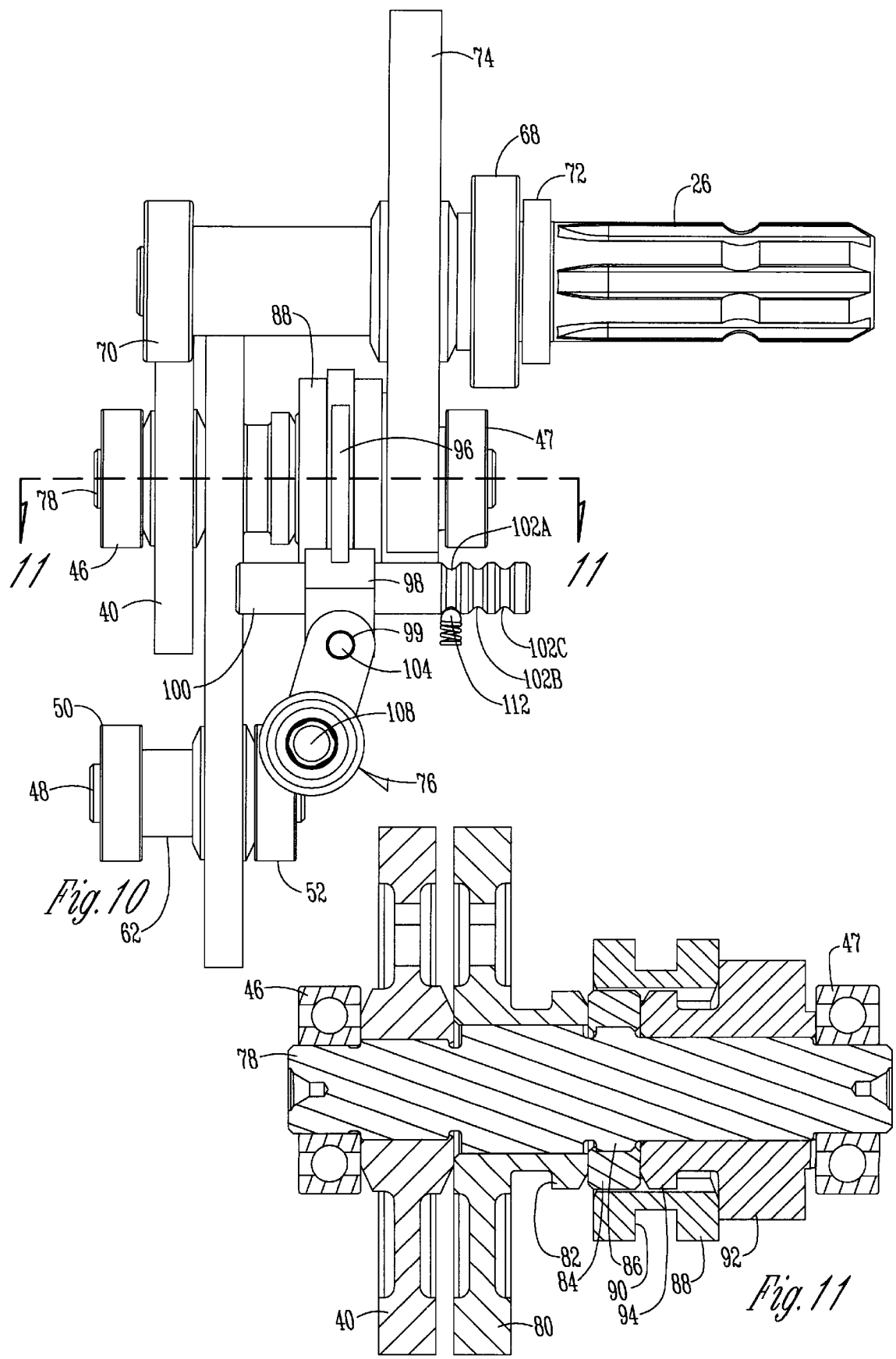

KIT FOR A POWER TAKEOFF ASSEMBLY FOR CONVERTING SAME TO INCLUDE SELECTIVELY CONTROLLED MULTIPLE POWER TAKEOFF SHAFTS

CROSS REFERENCE TO RELATED APPLICATION

This application is a divisional application Ser. No. 08/837,209 filed Apr. 14, 1997, now U.S. Pat. No. 5,901,605.

BACKGROUND OF THE INVENTION

This invention relates to the field of tractors and similar equipment wherein one or more power takeoff (PTO) shafts are utilized. More particularly, this invention relates to a PTO driving assembly which allows a base unit having only a mid PTO to be produced and efficiently converted later to a unit having both a mid PTO shaft and a rear PTO shaft. The PTO shafts in the converted unit can be selectively activated separately or in combination.

Power takeoff shafts are well known. PTO shafts are used on large, medium and small horsepower tractors for a variety of reasons. On some conventional tractors, a PTO shaft extends rearwardly from the power plant or transmission to supply rotary power to equipment towed behind the tractor. On other tractors, a mid PTO shaft extends from the middle portion of the tractor to operate equipment, such as a mower deck, located thereunder.

Recently, tractor transmissions which have both mid and rear PTO shafts have been developed. Both the mid and rear PTO shafts, when engaged, rotate whenever the engine or transmission rotates. Frequently, the customer or end user does not always want both PTOs to operate all of the time.

Some manufacturers incorporate a selector mechanism into the transmission so the user can select which PTO shaft to activate. The cost of the base machine increases when the selector mechanism is incorporated. Not all customers may need, want or be willing to pay for the higher cost units. These market pressures may force the manufacturer to produce two different models, one providing the mid PTO shaft only and another model providing both mid and rear PTO shafts. The manufacturer incurs higher production and inventory costs. Distributors and dealers also face higher inventory costs when they stock both models.

Therefore, a primary object of this invention is a provision of a PTO driving assembly which is an improvement over existing PTO driving assemblies.

A further object of the present invention is a provision of a PTO shaft driving assembly wherein the mid PTO and rear PTO shafts are selectively rotatable (together or individually) depending upon the position of a three-position selector mechanism.

A further object of this invention is a provision of a PTO driving assembly which allows the manufacturer to provide a low cost base unit with mid PTO only and a conversion kit which can be utilized anytime after the initial assembly to convert the base unit to a selectable mid and rear PTO driving assembly.

A further object of this invention is the provision of a PTO driving assembly which is flexible in use.

A further object of the present invention is the provision of a PTO driving assembly which allows conversion by removing one or more rear covers from a single end of the transmission.

A further object of the present invention is the provision of a PTO driving assembly which is inexpensive to manufacture, reliable, and durable in use.

These and other objects will be apparent from the drawings, and the description and claims which follow.

SUMMARY OF THE INVENTION

The present invention relates to a vehicle transmission assembly which includes a power means, a clutch connected to the power means and having an output power shaft, and a plurality of gears in substantial alignment. The gears include a first gear on the power shaft meshed with a second gear mounted on a first shaft. The second gear drives a third gear mounted on another idler shaft. The third gear drives a fourth gear mounted on a mid PTO shaft. A rear PTO shaft is operatively connected to the first shaft. A three position selector assembly on the first shaft selectively powers the PTO shafts simultaneously or individually.

The present invention also provides an economical base unit having a plurality of gears meshed and aligned in a common vertical plane to drive only a mid PTO shaft. The base unit can be converted to the selectable mid and rear PTO arrangement described above by removing the rear cover, rearranging some existing gears and spacers, and installing a conversion kit that includes a modified rear cover, a rear PTO shaft and a selector assembly.

BRIEF DESCRIPTION OF THE DRAWINGS

FIG. 8 is an enlarged scale elevational view of the selector of FIG. 4 but with the selector in a position to drive only the mid PTO shaft.

FIG. 9 is a cross-sectional view taken along lines 9—9 in FIG. 8. FIG. 9 is similar to FIG. 5, except the selector has been moved to the left so only the mid PTO is driven.

FIG. 10 is a view similar to that of FIG. 8, except the selector has been moved to the right so only the rear PTO shaft is driven.

FIG. 11 is a cross-sectional view taken along lines 11—11 in FIG. 10.

DETAILED DESCRIPTION OF THE PREFERRED EMBODIMENT

Figure 1:
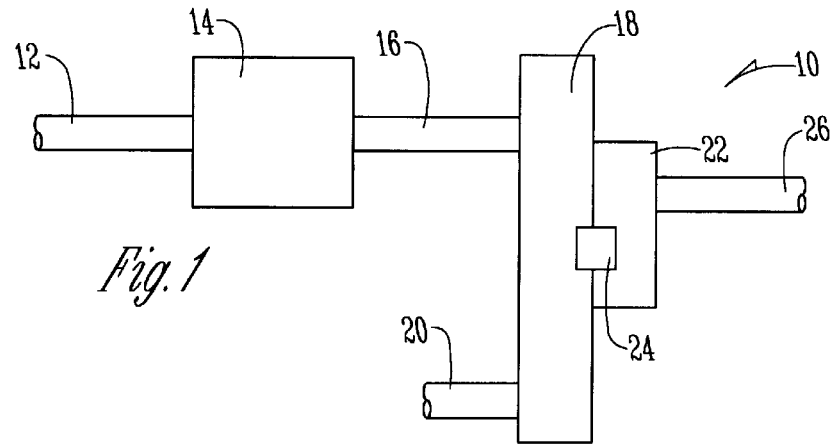
FIG. 1 is a simplified schematic diagram of the selectable mid and rear PTO shaft driving assembly of the present invention.

One of the PTO shaft driving assemblies of the present invention is shown in simplified schematic form in FIG. 1.

The PTO system 10 includes a power input shaft 12 which is drivingly connected to the input side of electromagnetic clutch 14. The output side of the clutch 14 has an output power shaft 16 extending therefrom. The output power shaft 16 engages first gear means 18. The first gear means 18 is selectively drivingly connected to a mid PTO shaft 20, a second gear means 22, and a rear PTO shaft 26 by selector means 24.

Figure 2:
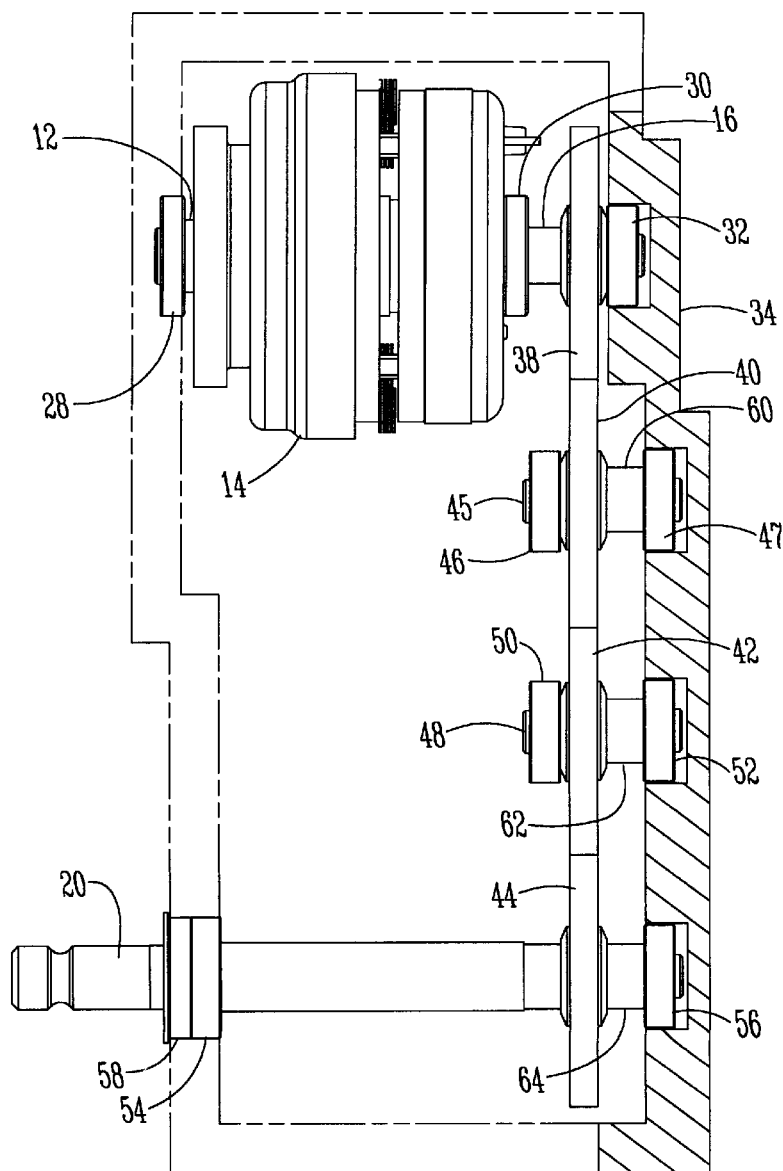
FIG. 2 is a partial vertical sectional view of the mid PTO (base unit) driving assembly of the present invention with the rear cover and casing shown in cross section and phantom lines, respectively.

As best seen in FIG. 2, the power input shaft 12 and the output power shaft 16 are supported by bearings 28 and 30 in the casing 36 (shown in phantom lines) and a bearing 32 in a rear cover 34. Thus, the clutch 14 is supported between the casing 36 and the rear cover 34.

Figure 3:
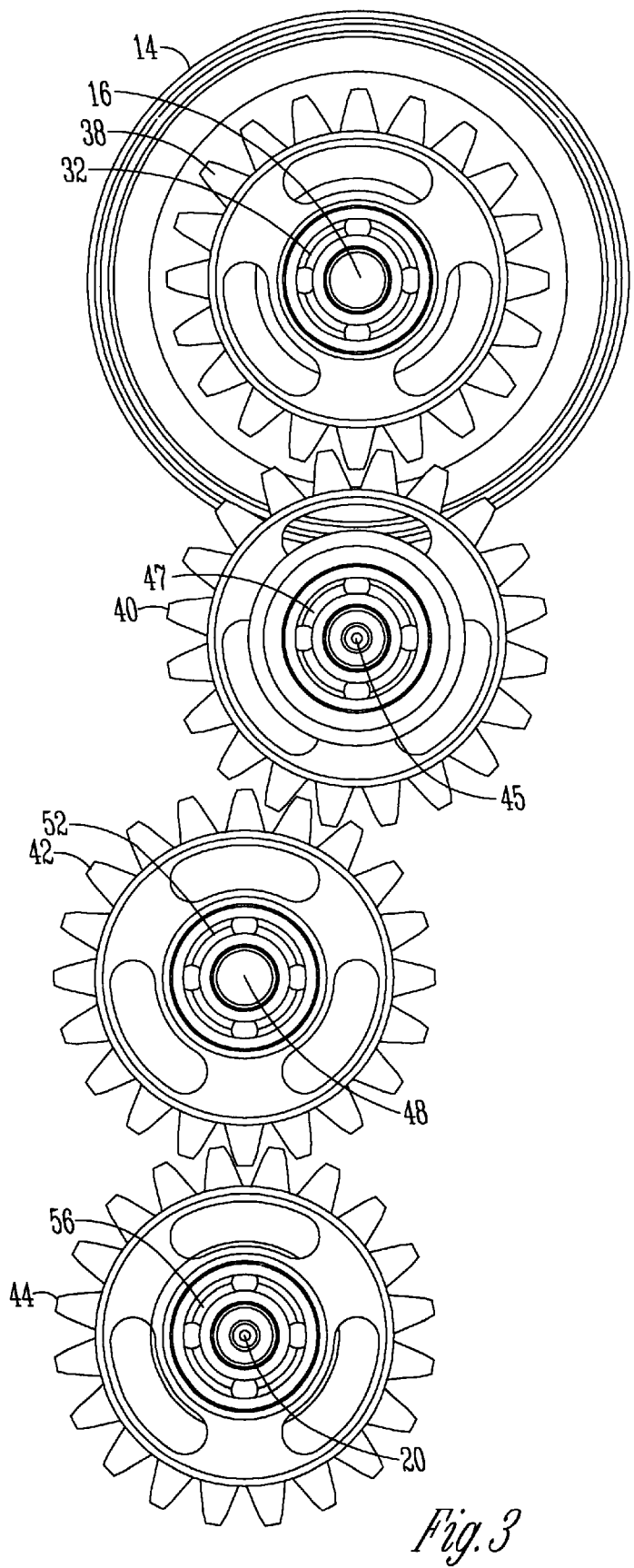
FIG. 3 is an enlarged scale rear elevation schematic view of the gears of the base unit assembly of FIG. 2 as seen with the rear cover removed.

Gears 38, 40, 42 and 44 are disposed and aligned in a common vertical plane (FIG. 2). The gears 38, 40, 42 and 44 are stacked on top of each other so that their gear teeth mesh, as shown in FIG. 3. Gear 38 is coupled or secured to the output power shaft 16 for rotation therewith. The top gear 38 and the second gear 40 mesh at their outer peripheries.

The gear 40 is mounted about a shaft 45 which is rotatably supported by bearings 46, 47. Preferably, spline means secure the gear 40 to the shaft 45 so that the gear 40 can be removed from the shaft 45 by sliding the gear axially. The gear 42 is similarly fixed for rotation with the shaft 48, which is rotatably supported by bearings 50, 52. The gears 40, 42 could be merely rotatably mounted on the shafts 45, 48 without detracting from the invention. In that case, shafts 45, 48 might be referred to as idler shafts.

The gear 44 is drivingly mounted on the mid PTO shaft 20. Again, a splined connection is preferred so that the gear 44 can be slid axially along the mid PTO shaft 20 for removal and conversion purposes.

Bearings 54 and 56 in the casing 36 and the rear cover 34, respectively, rotatably support the mid PTO shaft 20. A lip seal 58 adjacent the bearing 54 in the casing 36 prevents fluid leakage and keeps contamination out. Hollow tubular spacers 60, 62 and 64 mount on the shafts 45, 48, and 20 to the right of each of the gears 40, 42 and 44, respectively, as shown in FIG. 2.

When the PTO assembly of this invention is utilized in a compact utility tractor, a compact transaxle (not shown) can be located in the casing 36 between the mid PTO shaft 20 and the clutch 14.

The configuration shown in FIG. 2 defines what will be referred to as the base unit or "mid PTO only" configuration. The mid PTO shaft 20 rotates whenever the output power shaft 16 of the clutch 14 rotates. The mid PTO shaft 20 ceases to rotate when the clutch 14 ceases to rotate shaft 16. The base unit is inexpensive to manufacture because the number of parts is kept to a minimum. The rear cover 34 is relatively easy to machine and is therefore economical to produce. Vertical space is also conserved because the four gears 38–44 can be kept to a fairly small diameter. Preferably, gears 38–44 are identical gears of the spur or pinion type.

FIGS. 4–11 show an optional configuration to which the originally built base unit can easily be converted. Of course, the optional configuration can also be originally built on the assembly line, but the costs may be higher, as discussed above.

Figures 4, 5:
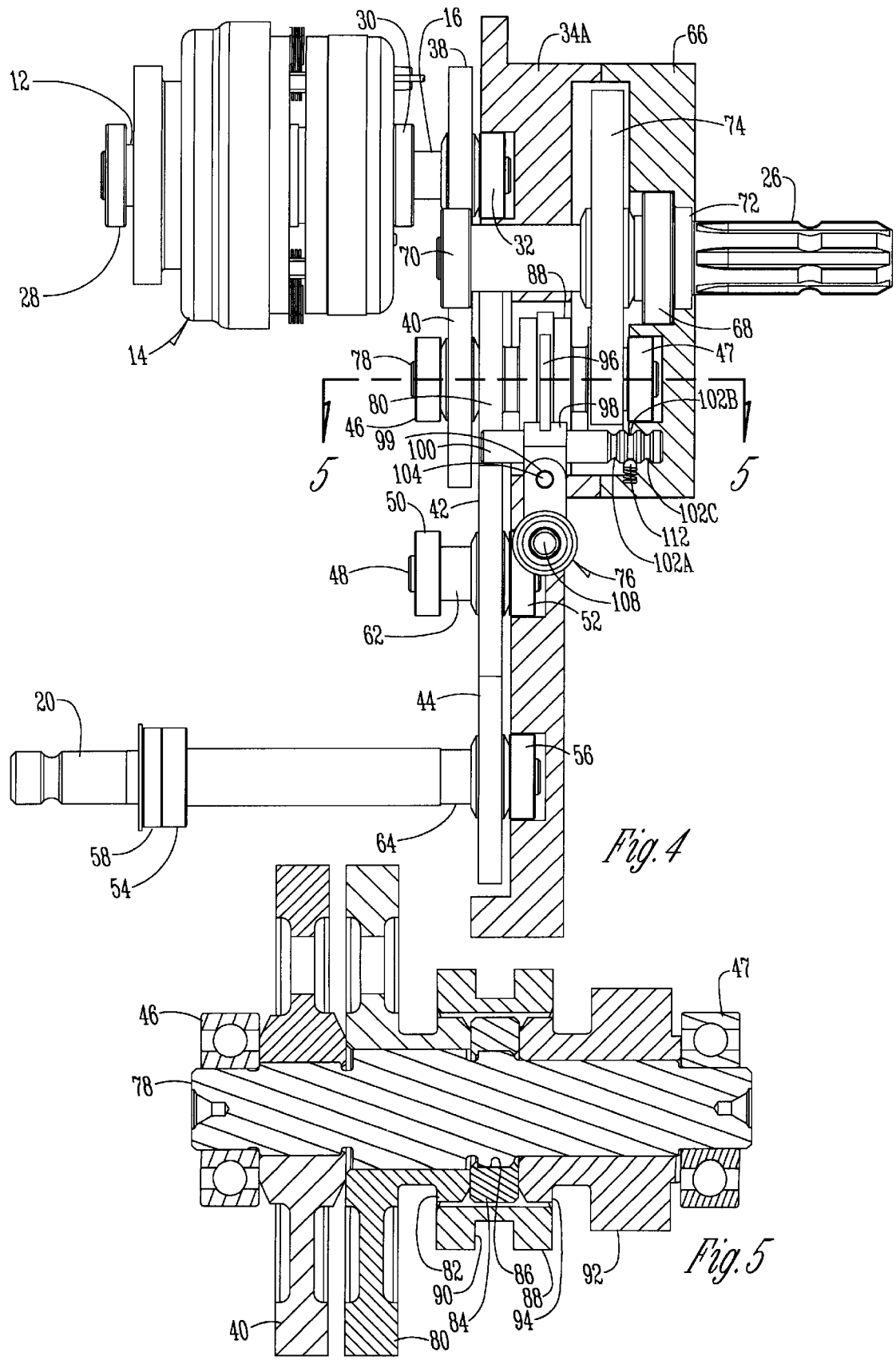
FIG. 4 is a partial sectional view, similar to FIG. 2, but shows the conversion thereof to the selectable mid and rear PTO assembly of FIG. 1. The selector is in a centered position wherein both the mid and rear PTO shafts are driven.
FIG. 5 is a cross-sectional view taken along line 5—5 in FIG. 4 and shows the means for selecting the PTO shaft(s) to be driven.

The original rear cover 34 (FIG. 2) has been replaced in FIG. 4 by a modified rear cover 34A. For reasons which will become apparent later, the spacers 62, 64 have been switched with the gears 42, 44, respectively, on the lower two shafts 48, 20. No new hardware is required for this switch, the positions of the spacers and the gears are merely switched on the shafts.

Figure 6:
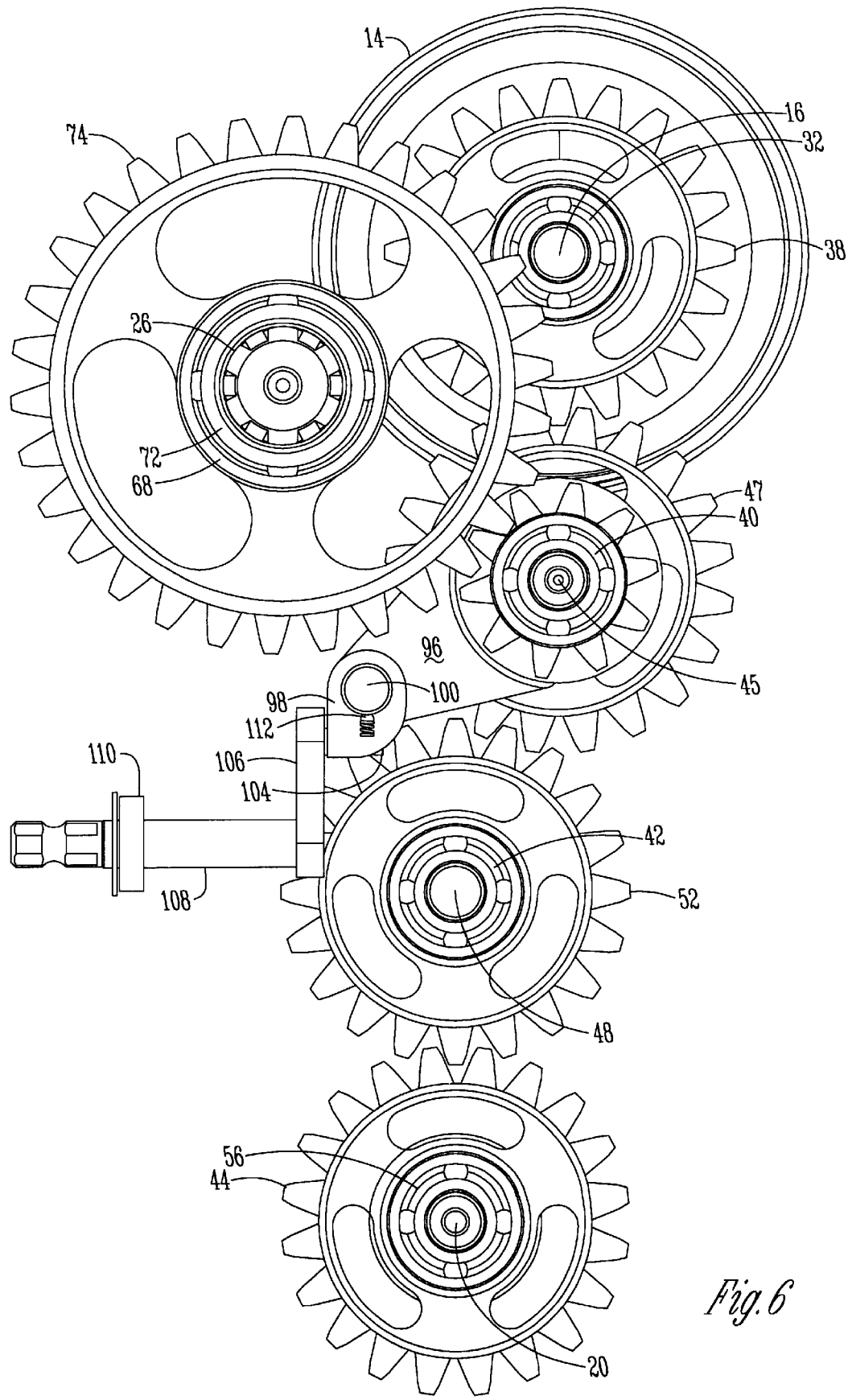
FIG. 6 is an enlarged scale schematic rear elevation view of the gears of FIG. 4 as generally seen from the righthand side of FIG. 4 when the rear covers are removed.

A rear PTO cover 66 detachably mounts on the modified rear cover 34A. The rear PTO cover 66 has a bearing 68 mounted therein to rotatably support the PTO shaft 26 in conjunction with a second bearing 70 mounted in the casing 36. A lip seal 72 prevents the leakage of fluid from around the PTO shaft 26. A rear PTO gear 74 is drivingly connected to the rear PTO shaft 26. As best seen in FIG. 6, the rear PTO gear 74 is laterally offset from the clutch output power shaft 16, shaft 45, shaft 48, and the mid PTO shaft 20.

Referring again to FIG. 4, a selector means 76 is operatively interposed between the rear PTO gear 74 and the gears 42, 44 connected to the mid PTO shaft 20. The selector means or assembly 76 includes an elongated selector shaft 78 having ends rotatably supported by bearings 46, 47 in the casing 36 and the rear PTO cover 66, respectively. A gear 40 is secured by splines or other suitable driving means to an intermediate portion of the selector shaft 78 for rotating it. A mid PTO drive gear 80 is slidably and rotatably mounted on the selector shaft 78 adjacent the gear 40. As best seen in FIG. 5, the mid PTO drive gear 80 has an outwardly directed splined flange 82 thereon.

A ring or drive collar 84 is secured for rotation with the selector shaft 78 adjacent the splined flange 82. The collar 84 has a splined inside diameter for securing it to corresponding splines 86 on the selector shaft 78. Furthermore, the drive collar 84 has splines on its outside diameter which engage corresponding splines on the inside diameter of a selector ring 88 to rotate it. The selector ring 88 includes an annular groove 90 centrally located along its outside diameter.

A rear PTO drive gear 92 slidably mounts on the selector shaft 78 adjacent the drive collar 84 and opposite the mid PTO drive gear 80. The rear PTO drive gear 92 includes a splined flange 94 adjacent the drive collar 84. The rear PTO drive gear 92 extends under the selector ring 88 when the selector ring is in the position shown in FIGS. 4–7 and 10–11. As best seen in FIG. 5, the gear 40 drives the selector shaft 78 and the drive collar 84 thereon. The splined inside diameter of the selector ring 88 simultaneously engages the drive collar 84 and the mid and rear PTO drive gears 80, 92 through their respective splined flanges 82, 94. The mid PTO drive gear 80 then drives the gears 42, 44 and ultimately rotates the mid PTO shaft 20. Meanwhile, the rear PTO drive gear 92 has a geared outer diameter which engages corresponding gears on the rear PTO gear 74 to drive the rear PTO shaft 26. Thus, when the selector ring 88 is in the position shown in FIG. 5, both the mid and rear PTO shafts 20, 26 are driven simultaneously and under the control of a single clutch 14.

Figure 7:
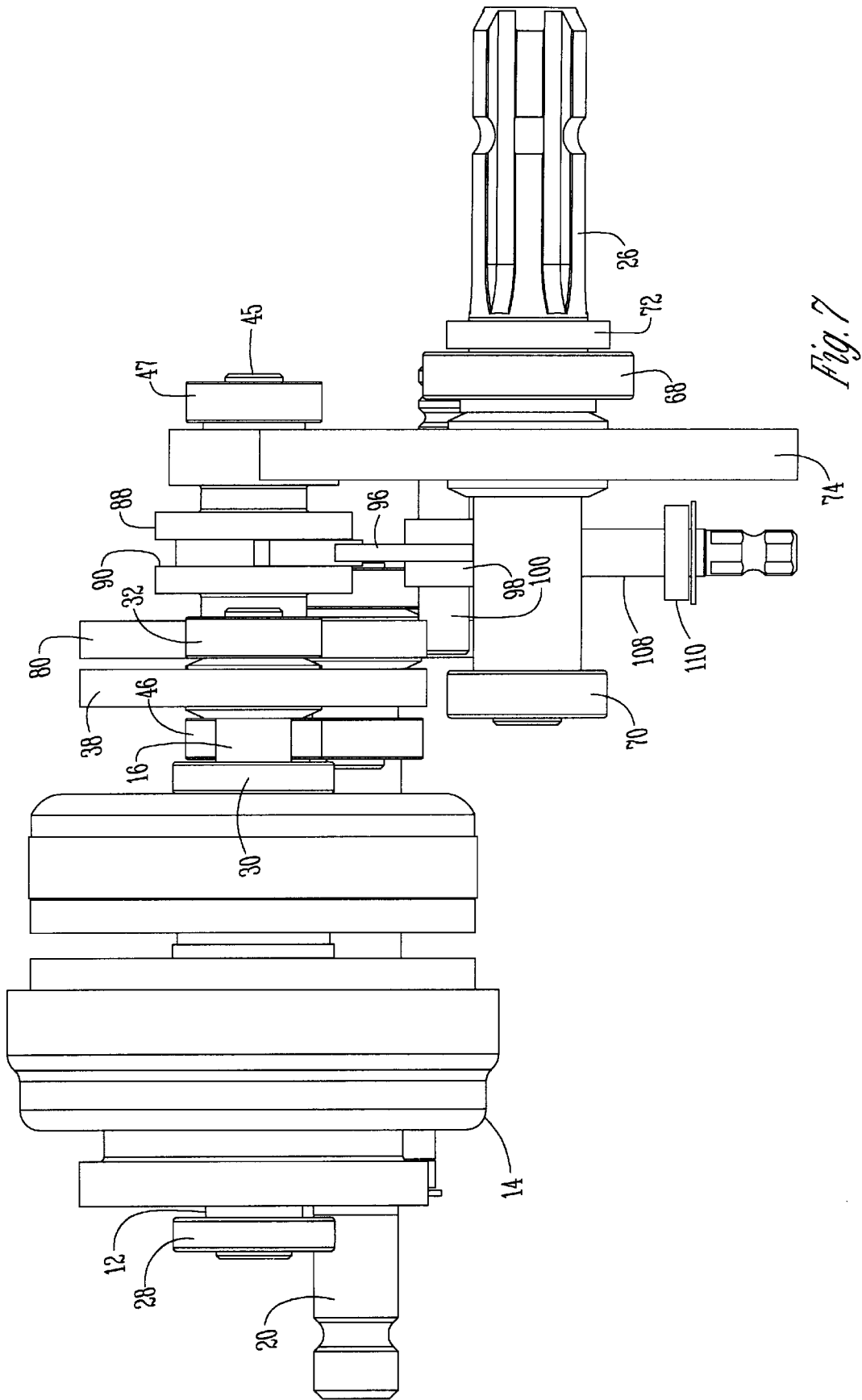
FIG. 7 is an enlarged scale top view of the clutch and rear PTO shaft as seen from the top of FIG. 4.

The selector ring 88 is positioned by a selector arm or yoke 96 which extends into the annular groove 90 and partially around the circumference of the selector ring 88 (see FIGS. 4, 6 and 7). The opposite end of the yoke 96 rigidly attaches to a guide bracket 98. The guide bracket 98 includes a hole 99 therein. A positioning shaft 100 is rigidly mounted in the hole 99. The positioning shaft 100 extends substantially parallel to the selector shaft 78. The ends of the positioning shaft 100 are slidably journalled in the rear cover 34A and the rear PTO cover 66, respectively. The end of the positioning shaft 100 extending into the rear PTO cover 66 has three identical, equally spaced annular grooves 102A, 102B, 102C therein (see FIG. 4).

A pin 104 pivotally attaches the guide bracket 98 to one end of a lever arm 106. As best seen in FIG. 6, a control shaft 108 is rigidly attached to the other end of the arm 106 and journalled in one of the covers 34A or 66. A lip seal 110 prevents the leakage of oil around the control shaft 108 and keeps contamination out.

Referring again to the positioning shaft 100, a spring loaded ball or detent 112 mounts in the cover 66 and yieldably extends into engagement with one of the annular grooves 102A, 102B or 102C, depending upon the axial position of the positioning shaft 100.

In regard to the operation of the invention, it should be first understood that no rotation of either the mid or rear PTO shafts 20, 26 takes place until the electromagnetic clutch 14 allows the power output shaft 16 to be rotated by the power means 12. The power output shaft 16 provides driving power to the gear 38, which also transmits power on the selector shaft 78 via the gear 40.

The control shaft 108 is connected by conventional linkage (not shown) to a lever or similar control means within the reach of the vehicle operator. When the control shaft 108 is rotated so that the positioning shaft 100 and the spring loaded detent 112 are in the positions shown in FIGS. 4–5, both the mid and rear PTO shafts 20 and 26 will be rotated because the splines on the drive collar 84, the drive gears 80, 92, and the selector ring 88 are intermeshed. In FIGS. 4 and 5, the detent 112 is in the groove 102B.

When the control shaft 108 is rotated in a counterclockwise direction, as shown in FIG. 8, the positioning shaft 100 moves to the left and the detent 112 is disposed in the groove 102C as shown. Thus, the yoke 96 also moves to the left, which forces the selector ring 88 to the left, as shown in FIG. 9. In this position, the selector ring 88 engages only the drive ring 84 and the splines 82 on the mid PTO drive gear 80. The rear PTO drive gear 92 is not engaged by the selector ring 88 in this position. Therefore, no rotary power will be transmitted to the rear PTO shaft 26 through the gear 74. The rear PTO drive gear 92 will simply rest loosely around the rotating selector shaft 78.

In FIG. 10, the control shaft 108 has been rotated in a clockwise direction, which forces the positioning shaft 100 and the yoke 96 rigidly attached thereto to move to the right until the detent 112 is disposed in the groove 102A. As best seen in FIG. 11, the selector ring 88 then engages the drive collar 84 and the splines 94 on the rear PTO drive gear 92. The rear PTO drive gear 92 rotates with the selector ring 88 and the drive shaft 78 so as to provide rotary power through the gear 74 to the rear PTO shaft 26. However, the splines 82 on the mid PTO drive gear 80 are not engaged by the selector ring 88. The gear 80 loosely rests on the selector shaft 78 as it rotates. Therefore, no rotary power is supplied to the mid PTO shaft 20 through the gears 80, 42 and 44, although the gear 40 does rotate and drive the selector shaft 78.

Thus, the PTO assembly of this invention provides a three-position selector means 76 which allows rotary power to be transmitted to a mid PTO shaft only, mid and rear PTO shafts simultaneously, or to a rear PTO shaft only, depending upon the position of the selector means.

Another aspect of this invention is that the above-described structure provides for a unique method of converting from a base unit having only a mid PTO shaft 20 (FIGS. 2–3), to an optional unit having a mid PTO shaft 20 and a rear PTO shaft 26 selectively driven by a selector means 76 (FIGS. 4–11). To accomplish the conversion, one addresses the rear of the base unit shown in FIG. 2. Access to the top, front, sides, or bottom of the unit is not necessary. This is particularly advantageous because these areas are not very accessible once the unit has been installed in a tractor. However, the rear of the unit is generally accessible in most tractor installations.

Next, the person doing the conversion removes the rear cover 34 and sets it aside. The bearings 52, 56 are removed from the lower shafts 48, 20 respectively. Then, the spacers 62, 64 and gears 42, 44 are removed from the shafts 48, 20. The spacers 62, 64 are then reinstalled on the shafts 48, 20 in the positions which the gears 42, 44 previously occupied. Thus, the spacers 62, 64 and the gears 42, 44, respectively, are interchanged or reversed. The changed positions can be seen in the lower portion of FIG. 4. To this point, no new hardware has been added.

In the conversion process, the shaft 45 is replaced with the selector shaft 78 and the associated components mounted thereon, as shown in FIG. 5. The bearings 46 and 47 can be either reused or replaced. Next, a new rear cover 34A is installed in place of the old rear cover 34. The positioning shaft 100, the yoke 96 and the guide bracket 98 are also installed in the rear cover 34A, as shown in FIGS. 4 and 6. Preferably, the yoke 96 extends into the slot 90 on the selector ring 88. The control shaft 108 is inserted into the rear cover 34A and rigidly attached to the lever arm 106. The lever arm 106 is pivotally connected to the guide bracket 98 by inserting the pin 104 into the hole 99. Finally, the seal 110 is pressed into the rear cover 34A around the control shaft 108.

Referring again to FIG. 4, the rear PTO shaft assembly, comprising the shaft 26, the bearings 68, 70 and the gear 74 is installed. Then, the rear PTO cover 66 is added and the lip seal 72 is installed around the shaft 26. Finally, the selector means 76 is adjusted by moving the control shaft 108 until the positioning shaft 100 positions the selector ring 88 with the yoke 96 into the position shown in FIG. 5. In this "centered" position, rotary power can be transmitted to both the mid and rear PTO shafts 20, 26. A spring loaded detent or ball 112 is then inserted into a receiving hole in one of the rear covers 34A or 66. The spring loaded detent 112 yieldably protrudes into the center groove 102B on the positioning shaft 100. The annular grooves 102A, 102B and 102C are disposed on the positioning shaft 100 so that the selector 88 can be set in the three positions shown in FIGS. 5, 9, and 11.

The conversion kit can include a loose, unassembled collection of the parts necessary for the conversion or the kit can include a preassembled module containing the necessary parts.

Therefore, the present invention provides a quick and relatively easy method of converting from a low cost base unit having only a mid PTO shaft to an optional configuration having both a mid and rear PTO shaft. This method does not require the entire transmission to be removed and rebuilt, nor does it require access to anything but the rear of the transmission.

Therefore, the present invention at least achieves its stated objectives.

What is claimed is:

1. A kit for converting a base transmission unit having a mid PTO shaft and a detachable original equipment rear cover, comprising:

a conversion rear cover interchangeably mountable on the base unit in place of the original equipment rear cover;

a rear PTO cover mounted to the conversion rear cover, the rear PTO cover having an aperture therethrough;

a selectively rotatable rear PTO shaft rotatable supported in the aperture of the rear PTO cover and extending into the conversion rear cover;

a three position selector assembly mounted to the conversion rear cover and the rear PTO cover, the selector assembly being capable of selectively drivingly engaging only the mid PTO in a first position of the selector assembly, both the mid PTO shaft and the rear PTO shaft in a second position of the selector assembly, and only the rear PTO shaft in a third position of the selector assembly; and the selector assembly comprising a selector shaft having a drive collar fixed for rotation therewith and first and second gear members slidably mounted on the selector shaft, each of the first and second gear members having a flange therein extending toward the drive collar, and a selector ring slidably mounted on the selector shaft for selectively coupling the drive collar with the flanges of the first and second gear members.

2. A kit for converting a base transmission unit having a mid PTO shaft and a detachable original equipment rear cover, comprising:

a conversion rear cover that is interchangeably mountable on the base unit in place of the original equipment rear cover;

a rear PTO cover mounted to the conversion rear cover, the rear PTO cover having an aperture therethrough;

a selectively rotatable rear PTO shaft rotatably supported in the aperture of the rear PTO cover and extending into the conversion rear cover;

a three position selector assembly mounted to the conversion rear cover and the rear PTO cover, the selector assembly being capable of selectively drivingly engaging only the mid PTO in a first position of the selector assembly, both the mid PTO shaft and the rear PTO shaft in a second position of the selector assembly, and only the rear PTO shaft in a third position of the selector assembly.

3. The kit of claim 2 wherein rear PTO shaft is rotatably supported in the aperture by a bearing.

4. The kit of claim 2 wherein rear PTO shaft extends completely through the conversion rear cover.

5. The kit of claim 2 wherein the selector assembly includes a selector shaft rotatably supported in the rear PTO cover and extending generally parallel to the rear PTO shaft.

* * * * *